US007119527B2

(12) United States Patent
Fernald

(10) Patent No.: US 7,119,527 B2
(45) Date of Patent: Oct. 10, 2006

(54) VOLTAGE REFERENCE CIRCUIT USING PTAT VOLTAGE

(75) Inventor: Kenneth W. Fernald, Austin, TX (US)

(73) Assignee: Silicon Labs CP, Inc., Austin, TX (US)

( * ) Notice: Subject to any disclaimer, the term of this patent is extended or adjusted under 35 U.S.C. 154(b) by 212 days.

(21) Appl. No.: 10/880,915

(22) Filed: Jun. 30, 2004

(65) Prior Publication Data

US 2006/0001412 A1 Jan. 5, 2006

(51) Int. Cl.
*G05F 3/16* (2006.01)
*G05F 1/10* (2006.01)
*H02J 1/10* (2006.01)

(52) U.S. Cl. ........................ 323/315; 323/313; 327/539

(58) Field of Classification Search ........ 323/312–315, 323/317, 907; 327/530, 538, 539, 542, 543
See application file for complete search history.

(56) References Cited

U.S. PATENT DOCUMENTS 5,942,888 A * 8/1999 Tan ............................ 323/315
6,097,180 A * 8/2000 Tsukude et al. ............ 323/313
6,111,396 A * 8/2000 Lin et al. .................... 323/313
6,791,307 B1 * 9/2004 Harrison ..................... 323/312

* cited by examiner

*Primary Examiner*—Matthew V. Nguyen
(74) *Attorney, Agent, or Firm*—Howison & Arnott, LLP

(57) ABSTRACT

A voltage reference generator is disclosed that includes a current generator for generating a current that is proportional to absolute temperature (PTAT), the current generator having an internal resistance. This provides a PTAT current that is proportional to the resistance and wherein the temperature coefficient of the PTAT current is defined by the resistance. An output node is driven by the current generator with the PTAT current. A stack of serial connected MOS devices is connected between the output voltage and a ground reference voltage. The stack of transistors has a transimpedance associated therewith which has a temperature coefficient that is opposite in polarity to the temperature coefficient of the internal resistance and of a magnitude to provide a voltage on the output node that is substantially stable over temperature.

12 Claims, 4 Drawing Sheets

VOLTAGE REFERENCE CIRCUIT USING PTAT VOLTAGE

TECHNICAL FIELD OF THE INVENTION

The present invention relates in general to voltage references and, more particularly, to a voltage reference utilized in a voltage regulator incorporating therein a low power band gap reference generator.

BACKGROUND OF THE INVENTION

Many analog circuits require voltage references, such as A/D and D/A converters, voltage regulators, etc. A voltage reference must be, inherently, well-defined and insensitive to temperature, power supply and load variations. The resolution of an A/D or D/A converter, for example, is limited by the precision of its reference voltage over the supply voltage range of the circuit and the operating temperature range thereof. A band gap reference voltage generator is a well utilized circuit that is typically used for the purpose of generating such a temperature independent reference voltage. These voltage references exhibit both high power supply rejection and possess a low temperature coefficient, and these type of voltage reference circuits are probably the most popular high performance voltage references utilized in integrated circuits. However, integrated circuit design is predominated by the need for low power, low voltage operation. This inherently will lead to the need for utilizing CMOS process technology, the technology of choice. Since the band gap reference is bipolar in nature, solutions are required to create the reference voltage without the use of the costly BiCMOS process. Further, for low power operation, there will typically be provided in the band gap reference ratiometric related resistors. In order to provide for a low current, one of these resistors is typically on the order of many times the size of the other resistor and this can lead to some fairly large resistors to realize the low current operation. The area required for these larger resistors is of concern and presents a disadvantage when considering an area efficient reference generator.

SUMMARY OF THE INVENTION

The present invention disclosed and claimed herein, in one aspect thereof, comprises a voltage reference generator. A current generator is provided for generating a current that is proportional to absolute temperature (PTAT), the current generator having an internal resistance. This provides a PTAT current that is proportional to the resistance and a voltage and wherein the temperature coefficient of the PTAT current is defined by both. An output node is driven by the current generator with the PTAT current. A stack of serial connected MOS devices is connected between the output voltage and a ground reference voltage. The stack of transistors has a transimpedance associated therewith and which has a temperature coefficient such that, when combined with the PTAT generated current, provides a voltage on the output node that is of sufficient magnitude and substantially stable over temperature.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
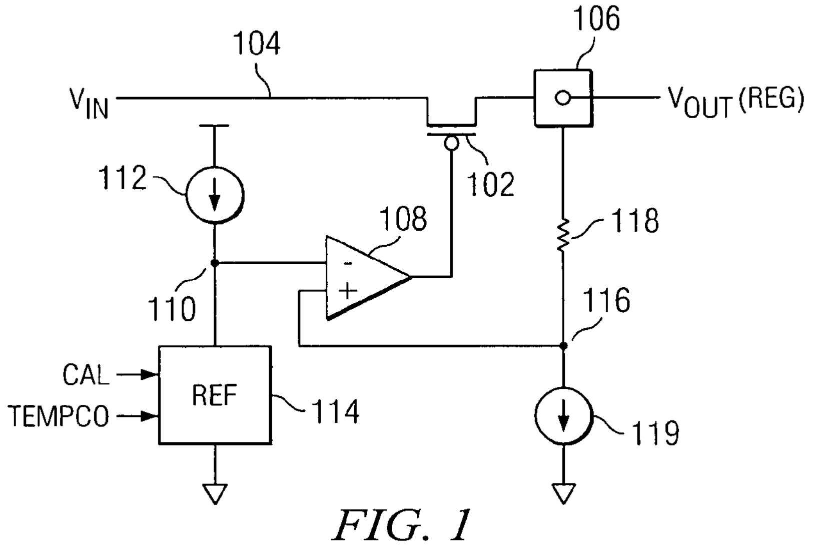
FIG. 1 illustrates a diagram for a regulator for receiving input voltage and providing an output regulated voltage and having an internal reference thereto.

Referring now to FIG. 1, there is illustrated a diagram for a voltage regulator. The voltage regulator basically is comprised of a p-channel pass transistor 102 having the source/drain thereof connected between an input voltage on node 104 and a regulated output voltage on output pad 106. The output regulated voltage on the output pad 106 drives the on-chip circuitry associated therewith (not shown). This is the regulated voltage output. The gate of the transistor 102 is driven by an amplifier 108 that provides the regulating voltage. The negative input of amplifier 108 is connected to a node 110. Node 110 has a current driven thereto by a current source 112 connected between the supply voltage and node 110 for driving a reference load device 114. The reference load device 114 will be described in detail herein below. The current source 112 provides a current that is a Proportional To Absolute Temperature (PTAT) current. This current has a Positive Temperature Coefficient (PTC) and the reference load 114 will have a counteracting Negative Temperature Coefficient (NTC), so as to provide an overall zero temperature coefficient (ZTC) output on node 110. In general, the current source 112 and output reference load 114 provide a voltage circuit.

The positive input of the amplifier 108 is connected to a node 116. Node 116 is also connected to one side of a current sink 119 to ground. The amplifier 108 will compare this voltage on node 116 with the voltage on node 110 and adjust the voltage on the gate of transistor 102 such that the voltage on node 106 is regulated to that on the reference node 110. Note that this is a fairly conventional regulator circuit with the exception of the way in which the reference voltage on node 110 is generated.

Figure 2:
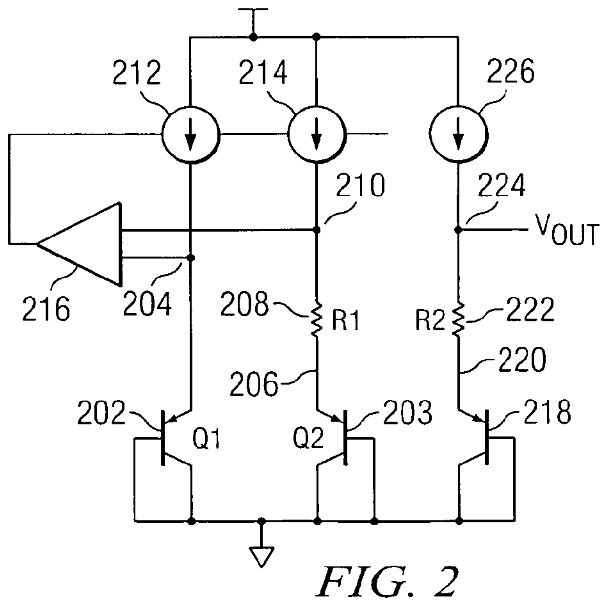
FIG. 2 (PRIOR ART)
FIG. 2 illustrates a schematic diagram of a prior art band gap generator.

Referring now to FIG. 2, there is illustrated a schematic diagram of a conventional prior art band gap generator. These type of band gap generator circuits are well known in the art. A first PNP transistor 202 is connected between a node 204 and ground with the emitter thereof connected to node 204 and the collector thereof connected to ground. The base thereof is connected to ground. As such, transistor 202 appears as a diode. A second PNP transistor 203 is connected between a node 206 and ground with the emitter thereof connected to node 206 and the collector thereof connected to ground. The base of transistor 203 is connected to ground and, therefore, it is configured as a diode between node 206 and ground. A resistor 208 is connected between node 206 and a node 210. A first current source 212 is connected between $V_{DD}$ and node 204 and drives the emitter of transistor 202. A second current source 214 is mirrored with transistor 212 and is connected between $V_{DD}$ and node 210 and drives the resistor 208 and transistor 203. An operational amplifier 216 has one input thereof connected to node 210 and one input thereof connected to node 204. The output of operational amplifier 216 is operable to vary the currents through current sources 212 and 214.

An output leg is provided with a PNP transistor 218 connected between a node 220 and ground, the emitter thereof connected to node 220 and the collector thereof connected to ground. The base thereof is connected to ground also. This is a diode configured transistor. A resistor 222 is connected between an output node 224 and node 220. A third current source 226 is connected between $V_{DD}$ and node 224 and drives the current thereto. For discussion purposes, transistor 202 will be labeled Q1, transistor 203 labeled Q2, resistor 208 labeled R1 and resistor 222 labeled R2. The voltage on the node 224 is defined as:

$$V_{ref} = V_{EBQ3} + \frac{R_2}{R_1} V_T \ln\left(\frac{A_1}{A_2}\right)$$

This is a well understood equation and is found in most text books on the subject matter.

Both of the resistors 208 and 222 have a Positive Temperature Coefficient (PTC). If resistor 222 were the same value as resistor 208, then the variation with respect to temperature would be the same. To minimize this, it is typical to increase the size of resistor 222 relative to that of resistor 208 such that resistor 222 is on the order of approximately five times the size of resistor 208. However, it can be noted that the drop across the emitter-base junction of transistor 218 will be 0.7V and this is defined by the physics of the semiconductor device. This is fairly constant even through process variations. The PTAT current flowing through resistor 222 is ratiometrically related to the current flowing through resistor 208. By increasing the size of resistor 222 relative to resistor 202, the PTC is amplified. For example, the emitter-based junction of transistor 218 or the diode provided thereby has a Negative Temperature Coefficient (NTC) of approximately −2 mV/° C. The voltage I-R using resistor 206 has a temperature coefficient of +0.5 mV/° C., such that four resistors the size of resistor 206 that would comprise resistor 222 would result in a +2.0 mV/° C. PTC. This would offset the temperature coefficient of the diode 218 and would provide a temperature stable output voltage on node 224. Again, this is a conventional operation.

For low current operations, it is desirable to minimize the amount of current that flows through resistor 208 and resistor 222. If resistor 208 is increased in size, since the diode in transistor 203 has a relatively fixed voltage there across, then a much lower current can be provided. However, this then requires that resistor 222 to be much larger. The problem this presents in a low current operational mode is that the resistors become very large and can occupy a large amount of area. For example, for a low current operation, the resistor 208 might be of the size 127 kilo-ohms and the resistor 222 could be on the order of 522 kilo-ohms. These are very large resistors and take up a lot of area and are not very area efficient.

Figure 3:
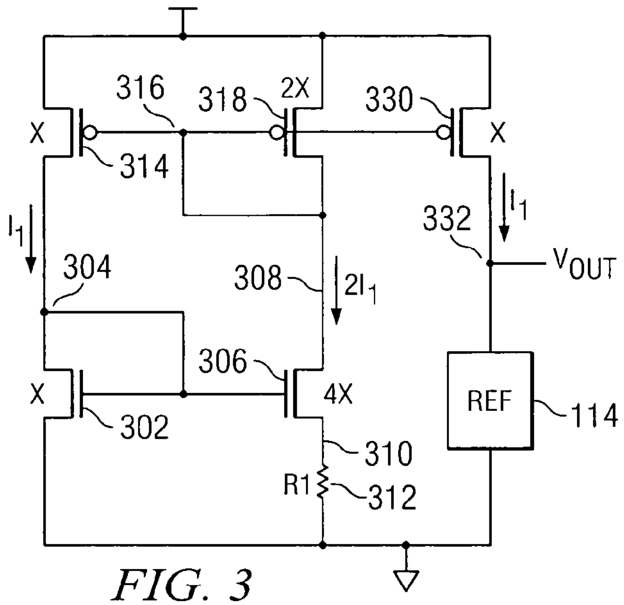
FIG. 3 illustrates a schematic diagram of the reference generator of the present disclosure for generating the internal reference voltage.

Referring now to FIG. 3, there is illustrated a schematic diagram of the voltage reference circuit of the present disclosure with an area efficient output load device which is comprised of a stack of saturated and linear devices with a PTAT current flowing there through. An n-channel transistor 302 has the source/drain path thereof connected between a node 304 and ground, the gate thereof connected to node 304. A second n-channel transistor 306 has the source/drain path thereof connected between a node 308 and a node 310. Node 310 is connected to one side of a resistor 312, the other side thereof connected to ground. Node 304 is connected to one side of the source/drain path of a p-channel transistor 314, the other side thereof connected to $V_{DD}$. The gate of transistor 314 is connected to a node 316 with a second p-channel transistor 318 having the source/drain path thereof connected between $V_{DD}$ and the node 308, the gate of p-channel transistor 318 connected to node 316 in a diode-configured manner. In this embodiment, transistor 314 is sized at "X" and transistor 318 is sized at "2x." Therefore, the current flowing through transistor 314 will be $I_1$ and the current flowing through transistor 318 will be $2I_1$. Thus, the current flowing through resistor 312 will be $2I_1$. The currents $I_1$ and $2I_1$ are PTAT currents. This is sometimes referred to as a self-biased low current reference generator.

The current through transistors 314 and 318 is mirrored to a p-channel transistor 330 having the source/drain path thereof connected between $V_{DD}$ and an output node 332, the gate thereof connected to node 316. Transistor 330 is sized in the disclosed embodiment to "X" such that the current there through is $I_1$. Node 332 is connected to one side of the output node reference 114 to ground. The PTAT current flowing through the output reference node 114 will vary over temperature, but the impedance of the output mode reference 114 will vary as a function of temperature to maintain the voltage on node 332 at a temperature independent level. This will be described in more detail herein below. As will also be described herein below, the output reference node 114 is fabricated with a stack of linear and saturated MOS devices and, therefore, will have significantly less area associated with the construction thereof and is easily programmed.

Figure 4:
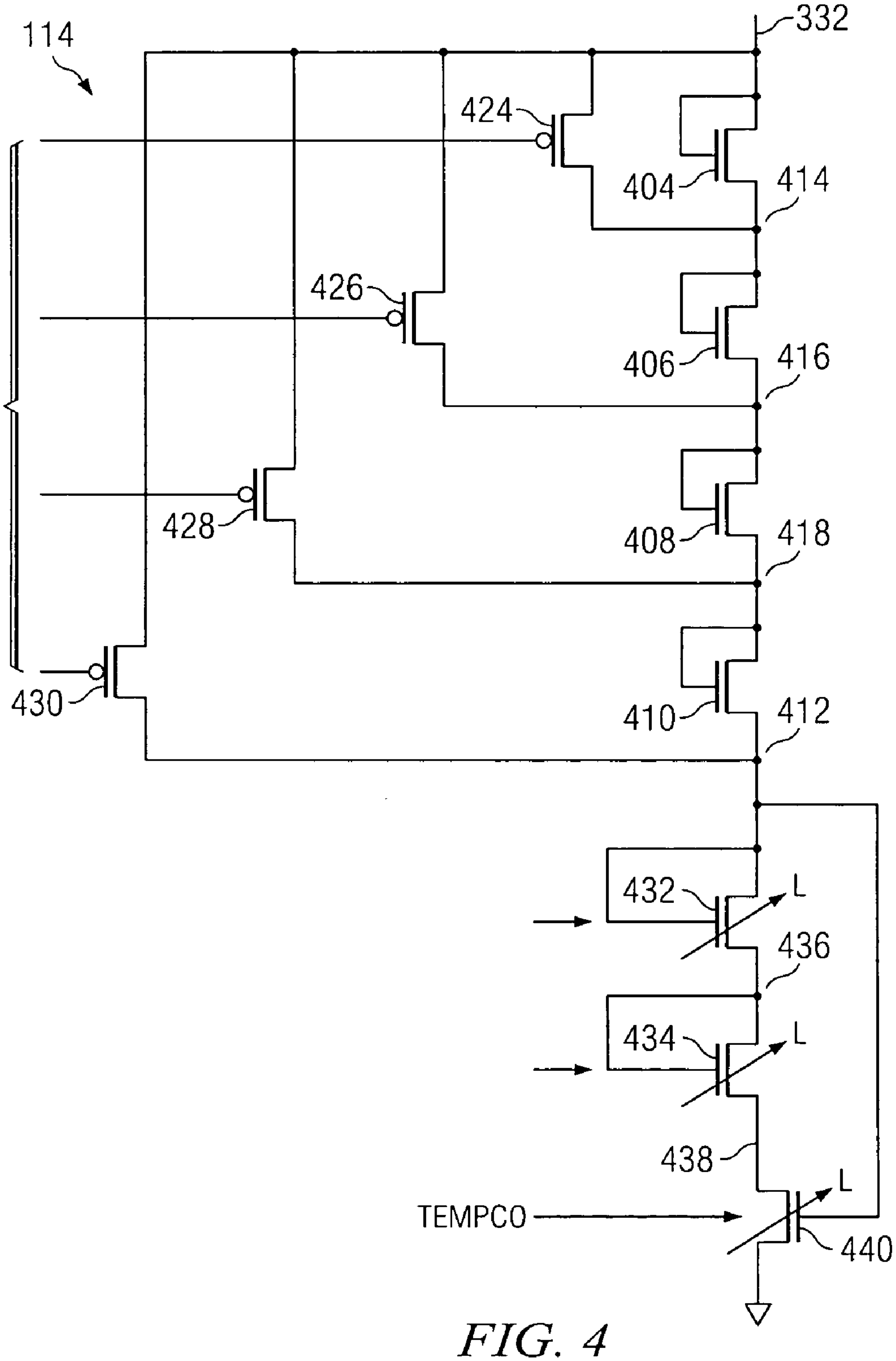
FIG. 4 illustrates a schematic diagram for the output reference device.

Referring now to FIG. 4, there is illustrated a schematic diagram of the output reference mode 114. There are provided four n-channel transistors 404, 406, 408 and 410 connected in series between node 332 and a node 412 in a stack. Transistor 404 has the source/drain path thereof connected between node 332 and a node 414, the gate thereof connected to the source at node 332 in a diode configuration. Transistor 406 is also connected in a diode configuration with the source/drain path thereof connected between node 414 and a node 416, the gate thereof connected to node 414. Transistor 408 has the source/drain path thereof connected between node 416 and a node 418, the gate thereof connected to node 416. Transistor 410 has the source/drain path thereof connected between node 418 and node 412, the gate thereof connected to node 418. Transistors 404–410 are therefore configured such that they are operating in the saturated mode. The voltage across the source/drain path of each of the transistors 404–410 will be the gate-to-source voltage, $V_{GS}$, due to the way they are connected. The transistors 406–410 are low $V_T$ devices.

Each of the transistors 404–410 are operable to be switched out of the circuit between node 332 and node 412. A first p-channel transistor 424 has the source/drain path thereof connected between node 332 and node 414. The second p-channel transistor 426 has the source/drain path thereof connected between node 332 and node 416. A third p-channel transistor 428 has the source/drain path thereof connected between node 332 and node 418. A fourth p-channel transistor 430 has the source/drain path thereof connected between node 332 and node 412. The gates of transistors 424–430 provide the signals for selecting how many and which of the transistors 404–410 are connected in series between node 332 and node 412.

There are provided two variable length transistor structures 432 and 434, comprised of a transistor structure that effectively provides a transistor with a variable length for a given width. (It should be understood that the transistors could have a variable width also.) The variable length transistor structure 432 is connected between node 412 and a node 436. The variable length transistor structure 434 is connected between node 436 and a node 438. Each of the variable length transistor structures 432 and 434 is illustrated as a transistor having the gate thereof connected in a diode configuration such that they operate in the saturated range such that $V_{GS}$ is the voltage there across. Therefore, there will be a voltage $V_{GS}$ across nodes 412 and 436 and a voltage $V_{GS}$ across nodes 436 and 438, this being varied by varying the length of the transistor, as will be described herein below. A third variable length transistor structure 440 is provided and is disposed between node 438 and ground. This is illustrated as a transistor with an associated gate structure that is connected to node 412 and, therefore, operates in the linear region. The voltage there across will be the drain-to-source voltage, $V_{DS}$. Changing the length of transistors 432 and 434 changes the $V_{GS}$. Transistor operates like a linear $r_{ds}$ resistor with a PTC. Further, each of the variable length transistor structures 432 and 434 has the length varied there through for the purpose of changing the voltage on the output node 332 and calibrating out process variations. By changing the length on the transistors, there is provided an overall effect on the R of the device and the voltage thereacross.

Figure 5:
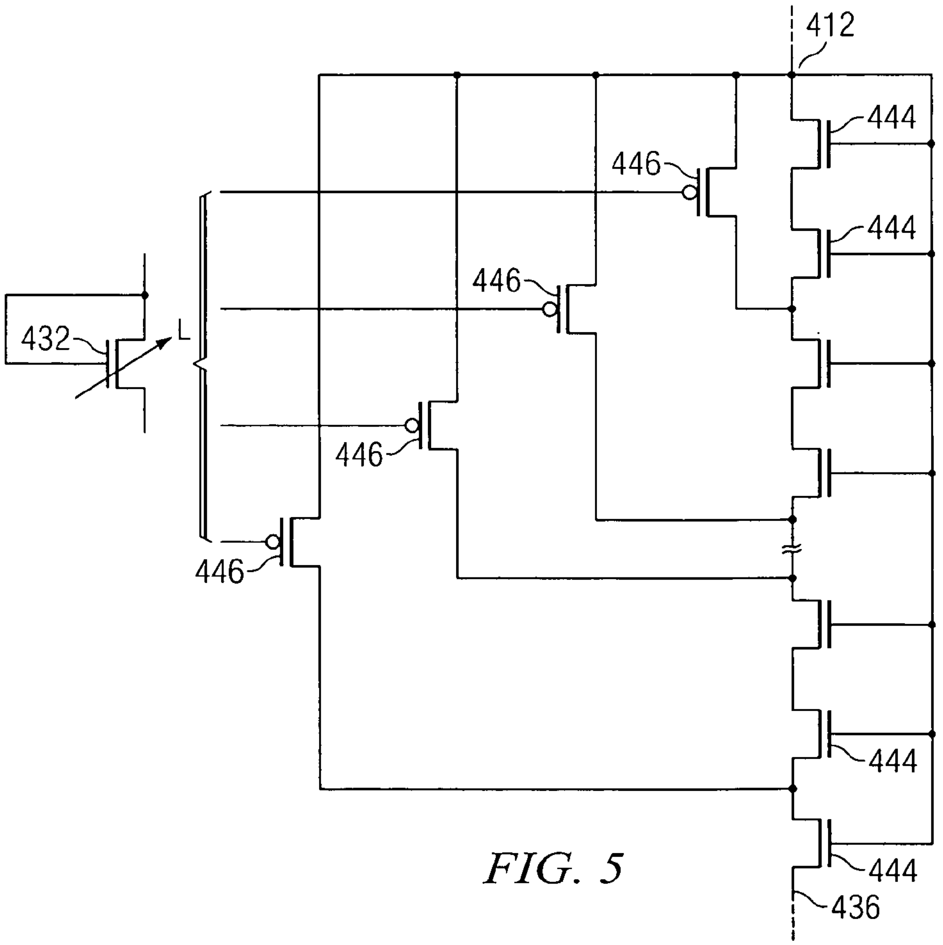
FIG. 5 illustrates a schematic diagram for the variable length diode-connected n-channel transistor in the output reference circuit.

Referring now to FIG. 5, there is illustrated a schematic diagram of either of the transistor structures 432 or 434, the transistor structure 432 being illustrated. The transistor structure 432 is comprised of a plurality of n-channel transistors 444 disposed in series with basically a common channel with the gates thereof all connected together and to the node 412. There are provided a plurality of p-channel transistors 446 that are connected between the node 412 and the source/drain junction of select ones of the transistors 444. In one disclosed embodiment, there are provided a plurality of these transistors 444. However, some of these transistors 444 have different L/W ratios (length-to-width ratios). For example, the first three of the transistors 444 connected to node 436 from the bottom thereof have widths of 5 microns, but lengths of 250 microns, one micron and five microns, respectively. The remaining of the transistors 444 have a width of one micron and a length of five microns. Therefore, it can be seen that the width of the channel for substantially all the transistors is approximately 1 micron. The p-channel transistors 446 are configured such that they selectively connect node 412 to eight (not all) of the source/drain junctions between transistors 444. The first five source/drain junctions between the first and second transistors 444 from node 436 extending up to node 412 will be selectively connectable to node 412 and also the eighth and twelfth source/drain junctions.

The transistor structure 434 is identical to structure 432 but connected between nodes 438 and 436.

Figure 6:
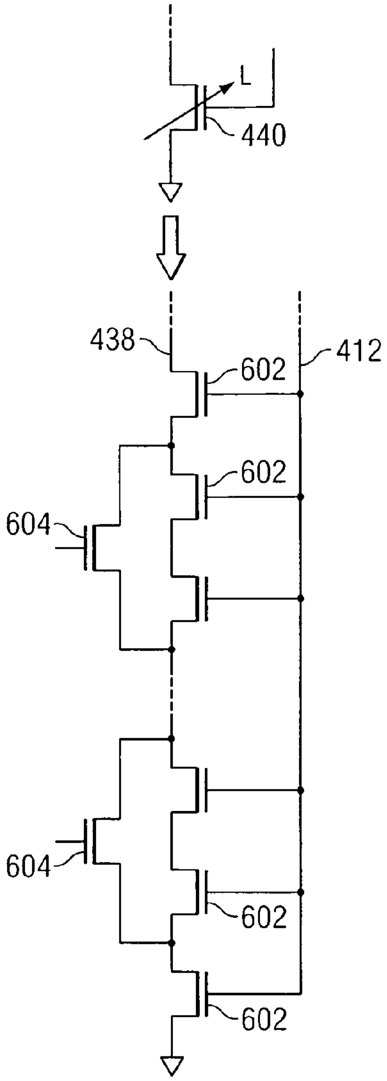
FIG. 6 illustrates a schematic diagram of the linear n-channel variable length transistor in the output reference circuit.

Referring now to FIG. 6, there is illustrated a schematic diagram of the variable length transistor structure 440. There are provided a plurality of n-channel transistors 602 connected in series between the node 438 and ground with all of the gates thereof connected to node 412, such that, as described herein above, they operate in the linear region. There will be provided a plurality of N-channel gate transistors 604 connected between select ones of the common source/drain junctions between adjacent ones of transistors 602 and other ones thereof. As such, the transistors 604 can selectively "short-out" select ones of the transistors 602 from the "stack." This is in response to a temperature coefficient adjustment for the overall stack of transistors comprised of the saturated and linear operating transistors.

Figure 7:
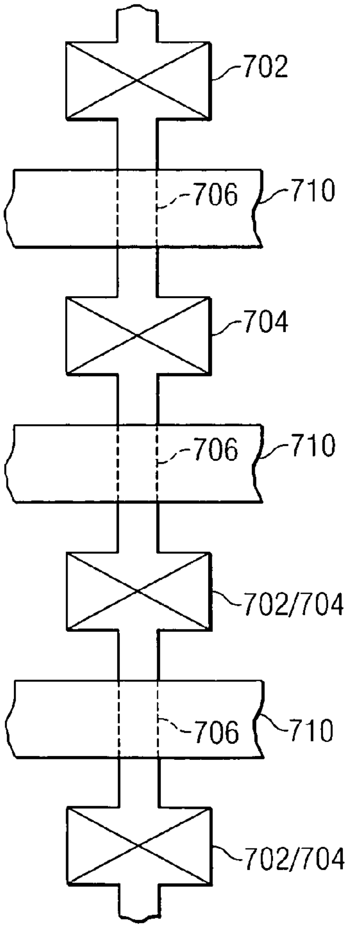
FIG. 7 illustrates a top view of the structure of the variable length transistors.

Referring now to FIG. 7, there is illustrated a layout for the transistors disposed in the stack, these being adjacent transistors. There is provided a common channel region that runs along a given length of the semiconductor substrate. This will typically be formed in an active region, such that a channel can be defined. Each transistor will be defined by a source region 702 and a drain region 704, it being noted that each of the source regions and drain regions are shared by another adjacent transistor, such that they are common source/drain regions. There will be a channel region 706 disposed there between, each channel region defined by a region of active semiconductor material disposed between insulated regions such as field oxide insulating regions. The source/drain regions 702/704 are heavily diffused regions that are of opposite conductivity to the conductivity type of the channel region. These allow for contacts from upper layers to interfaced therewith. As such, they may have a larger dimension than the channel region 706. Each of the channel regions has disposed there over a gate conductor 710, which gate conductor 710 is separated from the surface of the channel region by a layer of gate oxide. The length of the transistor is the dimension between the source/drain region 702/704. The width of the transistor is the width of the channel region. Therefore, it can be seen that by connecting transistors in this manner, a fairly long string of adjacently disposed transistors can be connected together. Further, if a diode connection is required, it is only necessary for the gate conductor to be connected to the appropriate one of the associated source/drain regions 702/704. This connection is not shown in this embodiment, as this merely shows the length of adjacently disposed transistors being stringed together.

Although the preferred embodiment has been described in detail, it should be understood that various changes, substitutions and alterations can be made therein without departing from the spirit and scope of the invention as defined by the appended claims.

What is claimed is:

1. A voltage reference generator, comprising:

a current generator for generating a current that is proportional to absolute temperature (PTAT), said current generator having an internal resistance, wherein said PTAT current is proportional to said resistance and wherein the temperature coefficient of said PTAT current is defined by said resistance;

an output node;

said current generator for driving said output node with said PTAT current; and a stack of serial connected MOS devices connected between said output node and a ground reference voltage, said stack of serial connected MOS devices having a transimpedance associated therewith which has a temperature coefficient that is opposite in polarity to the temperature coefficient of said internal resistance and of a magnitude to provide a voltage on said output node that is substantially stable over temperature.

2. The voltage reference of claim 1, wherein said stack of serial connected MOS devices comprises a stack of serial connected MOS transistors.

3. The voltage reference of claim 2, wherein at least a portion said MOS transistors operate in the saturated operating region.

4. The voltage reference of claim 2, wherein at least a portion said MOS transistors operate in the linear operating region.

5. The voltage reference of claim 4, wherein the remainder of said MOS transistors operate in the saturated operating region.

6. The voltage reference of claim 2, and further comprising a calibration device for selectively determining how many of said MOS transistors are connected in series in said stack.

7. The voltage reference of claim 2, wherein said stack of MOS transistors comprises:

a first stack of serially connected MOS transistors connected between said output node and an intermediate node; and a second stack of serially connected MOS transistors connected between said intermediate node and ground;

wherein said MOS transistors in at least one of said first and second stacks operates in saturation and said MOS transistors in the other of said first and second stacks operates in the linear operating range.

8. The voltage generator of claim 7, wherein said MOS transistors in said first stack operate in the saturated region, and having the gates thereof connected to a voltage higher than the voltage on said intermediate node.

9. The voltage generator of claim 8, wherein the gates of said MOS transistors in said first stack are connected in a diode configuration.

10. The voltage generator of claim 9, and further comprising a plurality of trimming transistors connectable between the source/drain junctions of associated select ones of said MOS transistors of said first stack and said output node to define the voltage drop there across.

11. The voltage generator of claim 8, wherein said MOS transistors have the gates thereof connected to a voltage higher than the voltage of said intermediate node.

12. The voltage generator of claim 9, and further comprising a plurality of trimming transistors connectable across the source/drain junctions of associated select ones of said MOS transistors of said first stack to define the voltage drop there across.

* * * * *